(12) United States Patent
Liang et al.

(10) Patent No.: US 12,302,449 B2
(45) Date of Patent: May 13, 2025

(54) IMS EMERGENCY SERVICE STATE INDICATION METHOD AND DEVICE

(71) Applicant: DATANG MOBILE COMMUNICATIONS EQUIPMENT CO., LTD., Beijing (CN)

(72) Inventors: Jing Liang, Beijing (CN); Rui Zhou, Beijing (CN); Nan Yan, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 368 days.

(21) Appl. No.: 17/790,611

(22) PCT Filed: Dec. 9, 2020

(86) PCT No.: PCT/CN2020/134850
§ 371 (c)(1),
(2) Date: Jul. 1, 2022

(87) PCT Pub. No.: WO2021/143404
PCT Pub. Date: Jul. 22, 2021

(65) Prior Publication Data
US 2023/0080088 A1    Mar. 16, 2023

(30) Foreign Application Priority Data

Jan. 19, 2020   (CN) .......................... 202010061871.X (51) Int. Cl.
*H04W 76/50*     (2018.01)
*H04L 9/40*      (2022.01)
(Continued)

(52) U.S. Cl.
CPC .............. *H04W 76/50* (2018.02); *H04L 9/40* (2022.05); *H04L 65/1016* (2013.01); *H04W 8/205* (2013.01); *H04W 48/08* (2013.01)

(58) Field of Classification Search
CPC ..... H04W 76/50; H04W 48/08; H04W 8/205; H04W 8/12; H04W 8/20; H04L 65/1016;
(Continued)

(56) References Cited

U.S. PATENT DOCUMENTS 9,219,650 B2 *  12/2015  Sakata ................ H04L 41/0897
2012/0231760 A1   9/2012  Zhu et al.
(Continued)

FOREIGN PATENT DOCUMENTS

CN         102118721 A      7/2011
CN         108738104 A     11/2018
(Continued)

OTHER PUBLICATIONS

3GPP Working Group, 3GPP TR 23.700-07, Technical Specification Group Services and System Aspects; Study on enhanced support of Non-Public Networks, (Release 17).
(Continued)

*Primary Examiner* — Wei Zhao
(74) *Attorney, Agent, or Firm* — Meunier Carlin & Curfman LLC (57) ABSTRACT

An indication method for an IMS emergency service state and device are provided. The method includes: a terminal operating in an SNPN mode receiving system information sent by a base station connected to an SNPN and a PLMN, wherein the system information includes first indication information indicating whether or not the SNPN supports an IMS emergency service, and second indication information indicating whether or not the PLMN supports an IMS emergency service; and the terminal operating in an SNPN mode determining, according to the first indication information, whether or not to allow initiation of an IMS emergency service on the SNPN.

20 Claims, 4 Drawing Sheets

(51) Int. Cl.
*H04L 65/1016* (2022.01)
*H04W 8/20* (2009.01)
*H04W 48/08* (2009.01)

(58) Field of Classification Search
CPC ... H04L 65/1095; H04L 65/1073; H04L 9/40; H04L 65/101; H04L 65/109; H04L 65/107
See application file for complete search history.

(56) References Cited

U.S. PATENT DOCUMENTS

| | | | |
|---|---|---|---|
| 2013/0090081 A1 | 4/2013 | Lim et al. | |
| 2014/0274149 A1* | 9/2014 | Alfalujah | H04W 4/025 455/456.3 |
| 2019/0327657 A1 | 10/2019 | Han et al. | |
| 2019/0357014 A1 | 11/2019 | Hu et al. | |
| 2023/0045195 A1* | 2/2023 | Abtin | H04W 8/06 |

FOREIGN PATENT DOCUMENTS

| | | |
|---|---|---|
| CN | 109309947 A | 2/2019 |
| CN | 110167000 A | 8/2019 |

OTHER PUBLICATIONS

Qualcomm Incorporated (rapporteur), Report for email discussion [107#40][NR/NPN] SIB1 design (Qalcomm), 3GPP TSG-RAN WG2 Meeting #107bis R2-1913633, Oct. 18, 2019.

Qualcomm Incorporated, Support for emergency services in SNPN, SA WG2 Meeting #136AH S2-2000817, Jan. 13-17, 2020.

3GPP TR 23.700-07, "3rd Generation Partnership Project; Technical Specification Group Services and System Aspects; Study on enhanced support of Non-Public Networks" (Release 17), vol. 2.0 (2019).

Qualcomm Incorporated, "Supporting SNPNs, CAGs and RAN sharing," 3GPP TSG-RAN WG2 Meeting #107, R2-1910767, Prague, Czech Republic Aug. 26-Aug. 30, 2019.

Ericsson, "SIB1 design for NPN," 3GPP TSG-RAN WG2 #108, Tdoc R2-1914628, Reno, USA, Nov. 18-Nov. 22, 2019.

* cited by examiner

IMS EMERGENCY SERVICE STATE INDICATION METHOD AND DEVICE

CROSS-REFERENCE OF RELATED APPLICATIONS

This application is a US National Stage of International Application No. PCT/CN2020/134850, filed on Dec. 9, 2020, which claims priority to Chinese Patent Application No. 202010061871.X, filed with the China National Intellectual Property Administration on Jan. 19, 2020 and entitled "IMS Emergency Service State Indication Method and Device".

FIELD

The disclosure relates to the field of wireless communication technologies, and particularly to an indication method and device for an IP Multimedia Subsystem (IMS) emergency service state.

BACKGROUND

A new type of network, i.e., Non-Public Network (NPN), is introduced in the 5G R16 release. The NPN may be deployed in a variety of ways, and may be deployed independently of the existing 5G Stand-alone Non-Public Network (SNPN) or may be deployed on the 5G Public Network Integrated NPN (PNI-NPN) by means of sharing.

A serving cell shared by an access network can be connected to Public Land Mobile Networks (PLMNs) or SNPNs of a plurality of operators at the same time, and relevant information of different PLMNs or SNPNs is indicated in a same set of system information broadcast by the cell. For an IMS emergency service, a terminal in a normal registration state can obtain a support state of a current PLMN for the IMS emergency service through Non-Access Stratum (NAS) signaling. For a terminal that resides in a current cell in a restricted state, since there is no NAS signaling interaction with the core network, the terminal cannot obtain the support state of the PLMN for the IMS emergency service from the NAS layer.

Therefore, how to enable the terminal working in the SNPN mode to obtain the support state of the SNPN for the IMS emergency service is an urgent problem to be solved at present.

SUMMARY

Embodiments of the disclosure provide an indication method and device for an IMS emergency service state, to indicate the IMS emergency service state to a terminal.

In a first aspect, an embodiment of the disclosure provides an indication method for an IMS emergency service state, including: receiving, by a terminal working in an SNPN mode, system information sent by a base station connected to an SNPN and a PLMN, where the system information includes first indication information for indicating whether the SNPN supports an IMS emergency service and second indication information for indicating whether the PLMN supports the IMS emergency service; determining, by the terminal working in the SNPN mode, whether to allow the IMS emergency service to be initiated on the SNPN according to the first indication information.

Optionally, the terminal receiving the system information sent by the base station further includes: a terminal working in a PLMN mode; and the method further includes: determining, by the terminal working in the PLMN mode, whether to allow the IMS emergency service to be initiated on the PLMN according to the second indication information.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1.

Optionally, the first indication information includes indication information for indicating whether there is an SNPN supporting the IMS emergency service in SNPNs connected to the base station.

Optionally, the indication method for the IMS emergency service state further includes: sending, by the terminal working in the SNPN mode, an SNPN network identifier of the SNPN where the terminal is currently located to the base station, so that the base station sends an IMS emergency service request sent by the terminal in the SNPN mode to the SNPN corresponding to the SNPN network identifier when the SNPN corresponding to the SNPN network identifier supports the IMS emergency service.

In a second aspect, an embodiment of the disclosure provides an indication method for an IMS emergency service state, including: sending, by a base station connected to an SNPN and a PLMN, system information, where the system information includes first indication information for indicating whether the SNPN supports an IMS emergency service and second indication information for indicating whether the PLMN supports the IMS emergency service; sending, by the base station, an IMS emergency service request to the SNPN supporting the IMS emergency service after receiving the IMS emergency service request sent by a terminal working in an SNPN mode; where the IMS emergency service request is sent by the terminal working in the SNPN mode according to the first indication information.

Optionally, the indication method for the IMS emergency service state further includes: sending, by the base station, an IMS emergency service request to the PLMN supporting the IMS emergency service after receiving the IMS emergency service request sent by a terminal working in a PLMN mode; where the IMS emergency service request is sent by the terminal working in the PLMN mode according to the second indication information.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1.

Optionally, the first indication information includes indication information for indicating whether there is an SNPN supporting the IMS emergency service in SNPNs connected to the base station.

Optionally, sending, by the base station, the IMS emergency service request to the SNPN supporting the IMS emergency service after receiving the IMS emergency service request sent by the terminal working in the SNPN mode, includes: sending, by the base station, the IMS emergency service request to the SNPN corresponding to an SNPN network identifier according to the SNPN network identifier sent by the terminal working in the SNPN mode to the base station when the SNPN corresponding to the SNPN network identifier supports the IMS emergency service, after receiving the IMS emergency service request sent by the terminal working in the SNPN mode; or selecting, by the base station, one of SNPNs supporting the IMS emergency service connected to the base station, and sending the IMS emergency service request to a selected SNPN, after receiving the IMS emergency service request sent by the terminal working in the SNPN mode.

In a third aspect, an embodiment of the disclosure provides a terminal, including: a receiving module, configured to receive system information sent by a base station connected to an SNPN and a PLMN, where the system information includes first indication information for indicating whether the SNPN supports an IMS emergency service and second indication information for indicating whether the PLMN supports the IMS emergency service; a processing module, configured to determine whether to allow the IMS emergency service to be initiated on the SNPN according to the first indication information when the terminal is a terminal working in an SNPN mode; and determine whether to allow the IMS emergency service to be initiated on the PLMN according to the second indication information the terminal is a terminal working in a PLMN mode.

In a fourth aspect, an embodiment of the disclosure provides a base station connected to an SNPN and a PLMN, including: a sending module, configured to send system information, where the system information includes first indication information for indicating whether the SNPN supports an IMS emergency service and second indication information for indicating whether the PLMN supports the IMS emergency service; a receiving module, configured to receive an IMS emergency service request sent by a terminal working in an SNPN mode, where the IMS emergency service request is sent by the terminal working in the SNPN mode according to the first indication information; a processing module, configured to send the IMS emergency service request to the SNPN supporting the IMS emergency service.

In a fifth aspect, an embodiment of the disclosure provides a terminal, including a processor, a memory and a transceiver; the transceiver is configured to receive and send data under control of the processor; the memory is configured to store computer instructions; the processor is configured to read the computer instructions to perform following operations: receiving system information sent by a base station connected to an SNPN and a PLMN, where the system information includes first indication information for indicating whether the SNPN supports an IMS emergency service and second indication information for indicating whether the PLMN supports the IMS emergency service; determining whether to allow the IMS emergency service to be initiated on the SNPN according to the first indication information.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1.

Optionally, the first indication information includes indication information for indicating whether there is an SNPN supporting the IMS emergency service in SNPNs connected to the base station.

Optionally, the operations further include: sending an SNPN network identifier of the SNPN where the terminal is currently located to the base station, so that the base station sends an IMS emergency service request sent by the terminal in an SNPN mode to the SNPN corresponding to the SNPN network identifier when the SNPN corresponding to the SNPN network identifier supports the IMS emergency service.

In a sixth aspect, an embodiment of the disclosure provides a base station, including a processor, a memory and a transceiver; the transceiver is configured to receive and send data under control of the processor; the memory is configured to store computer instructions; the processor is configured to read the computer instructions to perform following operations: sending system information, where the system information includes first indication information for indicating whether an SNPN supports an IMS emergency service and second indication information for indicating whether a PLMN supports the IMS emergency service; sending an IMS emergency service request to the SNPN supporting the IMS emergency service after receiving the IMS emergency service request sent by a terminal working in an SNPN mode; where the IMS emergency service request is sent by the terminal working in the SNPN mode according to the first indication information.

Optionally, the operations further include: sending an IMS emergency service request to the PLMN supporting the IMS emergency service after receiving the IMS emergency service request sent by a terminal working in a PLMN mode; where the IMS emergency service request is sent by the terminal working in the PLMN mode according to the second indication information.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1.

Optionally, the first indication information includes indication information for indicating whether there is an SNPN supporting the IMS emergency service in SNPNs connected to the base station.

Optionally, sending the IMS emergency service request to the SNPN supporting the IMS emergency service after receiving the IMS emergency service request sent by the terminal working in the SNPN mode, includes: sending the IMS emergency service request to the SNPN corresponding to an SNPN network identifier according to the SNPN network identifier sent by the terminal working in the SNPN mode to the base station when the SNPN corresponding to the SNPN network identifier supports the IMS emergency service, after receiving the IMS emergency service request sent by the terminal working in the SNPN mode; or selecting one of SNPNs supporting the IMS emergency service connected to the base station, and sending the IMS emergency service request to a selected SNPN, after receiving the IMS emergency service request sent by the terminal working in the SNPN mode.

In a seventh aspect, an embodiment of the disclosure provides a storage medium, where the computer-readable storage medium stores computer executable instructions, and the computer executable instructions are configured to cause a computer to execute the method described in the first aspect.

In an eighth aspect, an embodiment of the disclosure provides a storage medium, where the computer-readable storage medium stores computer executable instructions, and the computer executable instructions are configured to cause a computer to execute the method described in the second aspect.

In embodiments of the disclosure, the system information sent by the base station connected to the SNPN and the PLMN includes the first indication information for indicating whether the SNPN supports the IMS emergency service and the second indication information for indicating whether the PLMN supports the IMS emergency service, to respectively indicate whether the SNPN and the PLMN support the IMS emergency service, so that the terminal working in the SNPN mode can obtain the support state of the SNPN for the IMS emergency service and then determine whether to allow the IMS emergency service to be initiated on the SNPN.

BRIEF DESCRIPTION OF THE DRAWINGS

In order to illustrate technical solutions in embodiments of the disclosure more clearly, accompanying drawings which need to be used in describing embodiments will be introduced below briefly. Obviously the accompanying drawings described below are only some embodiments of the disclosure, and other accompanying drawings can also be obtained by those ordinary skilled in the art according to these accompanying drawings without creative labor.

DETAILED DESCRIPTION OF EMBODIMENTS

In order to make objects, technical solutions and advantages of the disclosure clearer, the disclosure will be further illustrated below in details with reference to the accompanying drawings. Obviously the described embodiments are merely a part of embodiments of the disclosure but not all embodiments. Based upon embodiments in the disclosure, all of other embodiments obtained by those ordinary skilled in the art without creative work pertain to the protection scope of the disclosure.

The "terminal" in embodiments of the disclosure is also called User Equipment (UE), Mobile Station (MS), Mobile Terminal (MT), etc., and is a device for providing voice and/or data connectivity to the user, e.g., a handheld device with the wireless connection function, a vehicle-carried device, etc. At present, some examples of the terminal are: mobile phone, tablet, laptop, palmtop computer, Mobile Internet Device (MID), wearable device, Virtual Reality (VR) device, Augmented Reality (AR) equipment, wireless terminal in the industrial control, wireless terminal in the self driving, wireless terminal in the remote medical surgery, and wireless terminal in the smart grid, wireless terminal in the transportation safety, wireless terminal in the smart city, wireless terminal in the smart home, etc.

The "base station" in embodiments of the disclosure may be an RAN node or a base station. The RAN is a part in the network that connects the terminal to the wireless network. The RAN node (or device) is a node (or device) in the radio access network, and may also be called base station. At present, some examples of the RAN node are: gNB, Transmission Reception Point (TRP), evolved Node B (eNB), Radio Network Controller (RNC), Node B (NB), Base Station Controller (BSC), Base Transceiver Station (BTS), home base station (for example, home evolved NodeB or Home Node B (HNB)), Base Band Unit (BBU), or Wireless Fidelity (Wifi) Access Point (AP), etc. Furthermore, in a network structure, the RAN may include a Centralized Unit (CU) node and a Distributed Unit (DU) node.

It should be understood that the terms "first", "second" and the like in embodiments of the disclosure are used to distinguish similar objects, but not necessarily to describe a particular order or sequence. It should be understood that data used in this way is interchangeable under appropriate circumstances, which can, for example, be implemented in an order other than those given in the illustration or description of embodiments of the disclosure.

Figure 1:
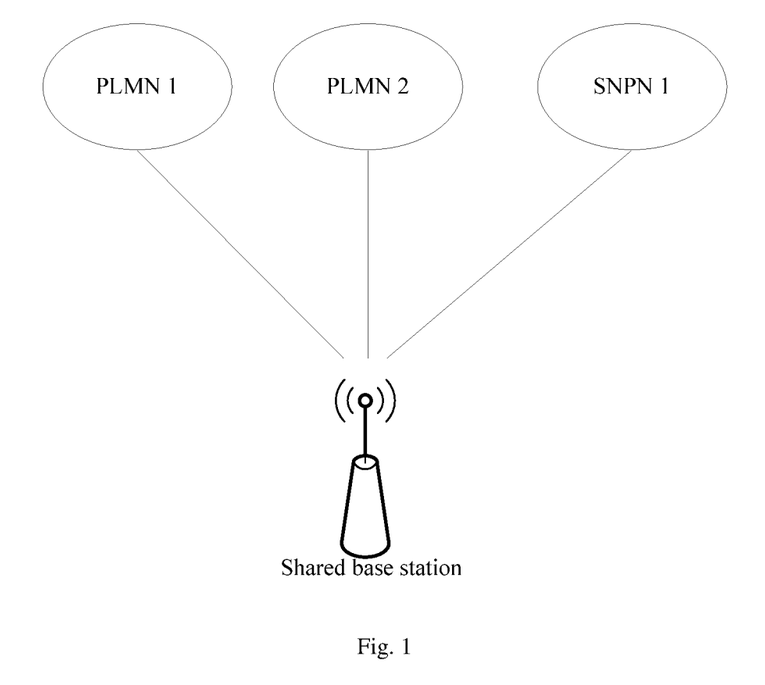
FIG. 1 shows a schematic diagram of an application scenario according to an embodiment of the disclosure.

FIG. 1 shows a schematic diagram of an application scenario according to an embodiment of the disclosure. As shown, the SNPN and the PLMN are connected to a same base station, which can be called a shared base station. The number of SNPNs connected to the base station may be one or more, the number of PLMNs connected to the base station may be one or more, and different PLMNs and SNPNs correspond to different network identifiers (e.g., network ID numbers). The PLMN is a network established and operated by the government or a government-approved operator (such as mobile operator, telecom operator, unicom operator, etc.) for the purpose of providing land mobile communication services to the public; the SNPN does not depend on the PLMN network and is operated by the SNPN operator. The PLMN and SNPN do not support the inter-network handover.

In the scenario where the base station is shared among common PLMNs, it is possible to indicate whether to support the IMS emergency service. As long as any PLMN connected to the base station supports the IMS emergency service, the serving cell may indicate the support of the IMS emergency service in the system information. When a terminal in the normal mode (including PLMN mode) initiates the IMS emergency service in the restricted state, the IMS emergency service may be sent by the base station to any PLMN that supports the IMS emergency service to successfully perform the IMS emergency service. However, for a terminal that supports the SNPN mode, the terminal can only use the services of the SNPN network when working in the SNPN mode. When the terminal in the SNPN mode is in the restricted state in the serving cell, the terminal can only perform the IMS emergency service through the SNPN and cannot perform the IMS emergency service through the PLMN.

In the scenario where the shared base station is connected to both an SNPN and a PLMN, if the connected PLMN supports the IMS emergency service but the SNPN does not support the emergency service, the terminal in the PLMN mode is allowed to initiate the IMS emergency service, and the terminal in the SNPN mode is not allowed to initiate the IMS emergency service.

In order to solve the above problem, an embodiment of the disclosure proposes an indication method for an IMS emergency service state. In the disclosure, the method of separately indicating the support state of the SNPN connected to the base station for the IMS emergency service solves the problem that it is impossible to distinguish whether the SNPN network connected to the current cell supports the IMS emergency service and thus guarantee the IMS emergency service on the SNPN network when the terminal in the SNPN mode is in the restricted state on the serving cell in the base station sharing scenario.

Figure 2:
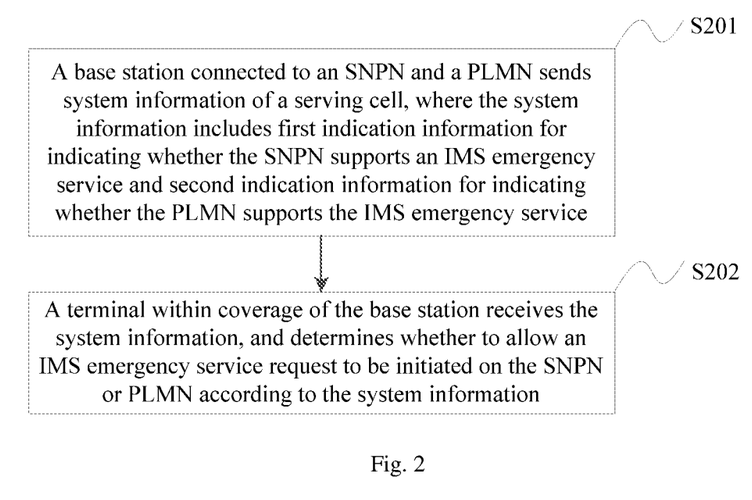
FIG. 2 shows a flowchart of an indication method for an IMS emergency service state according to an embodiment of the disclosure.

FIG. 2 shows a flowchart of an indication method for an IMS emergency service state according to an embodiment of the disclosure. The process includes: following steps.

S201: a base station connected to an SNPN and a PLMN sends system information of a serving cell, where the system information includes first indication information for indicating whether the SNPN supports an IMS emergency service and second indication information for indicating whether the PLMN supports the IMS emergency service.

In this step, the number of SNPNs may be one or more, and the number of PLMNs may also be one or more. The system information sent by the base station includes the first indication information for indicating whether the SNPN supports the IMS emergency service and the second indication information for indicating whether the PLMN supports the IMS emergency service, so that the support state of the PLMN for the IMS emergency service and the support state of the SNPN for the IMS emergency service can be respectively indicated in the system information.

S202: a terminal within coverage of the base station receives the system information, and determines whether to allow an IMS emergency service request to be initiated on the SNPN or PLMN according to the system information.

The terminal working in the SNPN mode within the coverage of the base station receives the system information sent by the base station, and determines whether to allow the IMS emergency service to be initiated on the SNPN according to the first indication information in the system information.

When the terminal working in the SNPN mode needs to initiate an IMS emergency service request, the terminal sends the IMS emergency service request to the serving base station if it is determined according to the received first indication information that the SNPN connected to the serving base station of the terminal supports the IMS emergency service. The terminal gives up initiating the IMS emergency service request if it is determined according to the received first indication information that the SNPN connected to the serving base station of the terminal does not support the IMS emergency service.

After receiving the IMS emergency service request sent by the terminal working in the SNPN mode, the base station sends the request to the SNPN supporting the IMS emergency service.

The terminal working in the PLMN mode within the coverage of the base station receives the system information sent by the base station, and determines whether to allow the IMS emergency service to be initiated on the PLMN according to the second indication information in the system information.

When the terminal working in the PLMN mode needs to initiate an IMS emergency service request, the terminal sends the IMS emergency service request to the serving base station if it is determined according to the received second indication information that the PLMN connected to the serving base station of the terminal supports the IMS emergency service. The terminal gives up initiating the IMS emergency service request if it is determined according to the received second indication information that the PLMN connected to the serving base station of the terminal does not support the IMS emergency service.

After receiving the IMS emergency service request sent by the terminal working in the PLMN mode, the base station sends the request to the PLMN supporting the IMS emergency service.

In some embodiments of the disclosure, the first indication information may include indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1. Here, the indication information of SNPNs may be network identifiers of the SNPNs or other information that can distinguish different SNPNs, such as indexes of the SNPNs.

Table 1 shows content of the first indication information in SIB1, where each SNPN connected to the base station includes an SNPN ID and information element "ims-EmergencySupport-snpn". The SNPN ID is the network identifier of the SNPN, and the value of "ims-EmergencySupport-snpn" is used to indicate whether the corresponding SNPN supports the IMS emergency service.

TABLE 1

| SIB1 | SNPN 1 | SNPN ID 1 |
| | | ims-EmergencySupport-snpn |
| | SNPN 2 | SNPN ID 2 |
| | | ims-EmergencySupport-snpn |
| | . . . | |

Optionally, in order to reduce the resource overhead, the information element "ims-EmergencySupport-snpn" may be 1-bit information. When the value of the information element is 1, the information element indicates that the corresponding SNPN supports the IMS emergency service; when the value of the information element is 0, the information element indicates that the corresponding SNPN does not support the IMS emergency service, and vice versa.

In other embodiments, the first indication information may not include the SNPN indication information (e.g., not include the SNPN ID), but only include the information element "ims-EmergencySupport-snpn". The order of SNPNs connected to the base station can be pre-agreed or pre-configured between the base station and the terminal. The base station can indicate in the system information whether each SNPN supports the IMS emergency service according to the order (for example, the first indication information includes N information elements "ims-EmergencySupport-snpn", and each information element "ims-EmergencySupport-snpn" corresponds to an SNPN and is used to indicate whether the corresponding SNPN supports the IMS emergency service). The terminal can determine whether the corresponding SNPN supports the IMS emergency service according to the received first indication information and the order of SNPNs.

When the terminal working in the SNPN mode needs to initiate an IMS emergency service request, the terminal sends the IMS emergency service request to the serving base station if it is determined according to the received system information that the SNPN connected to the serving base station supports the IMS emergency service. The IMS emergency service request may carry the indication information of the SNPN (such as a sequence index or network identifier of the SNPN), or may not carry the indication information of the SNPN. If the IMS emergency service request carries the indication information of the SNPN, the base station sends the IMS emergency service request to the corresponding SNPN according to the indication information of the SNPN; if the IMS emergency service request does not carry the indication information of the SNPN, the base station may send the IMS emergency service request to the corresponding SNPN according to the order of SNPNs connected to the base station that is pre-agreed or pre-configured between the base station and the terminal.

In some other embodiments of the disclosure, the first indication information includes indication information for indicating whether there is an SNPN supporting the IMS emergency service in SNPNs connected to the base station, that is, there is one piece of first indication information, and the one piece of first indication information is used to indicate whether there is an SNPN supporting the IMS emergency service in SNPNs connected to the base station. Compared with the previous embodiment, the network resource overhead occupied by the first indication information in this embodiment is less.

Optionally, the first indication information may be 1-bit information. When the value of the indication information is 1, the indication information indicates that there is an SNPN supporting the IMS emergency service in the SNPNs connected to the base station. When the value of the indication information is 0, the indication information indicates that there is no SNPN supporting the IMS emergency service in the SNPNs connected to the base station, and vice versa.

According to the above method for sending the first indication information, the base station may pre-configure or set the support states of the SNPNs connected thereto for the IMS emergency service. If at least one of the SNPNs connected to the base station supports the IMS emergency service, the value of the first indication information is set to 1. If none of the SNPNs connected to the base station supports the IMS emergency service, the value of the first indication information is set to 0. The terminal may determine whether the SNPN supports the IMS emergency service according to the value of the received first indication information, and then determine whether to initiate an IMS emergency service request on the SNPN.

For example, the information element "ims-EmergencySupport" and the information element "ims-EmergencySupport-snpn" may be defined in the system information (SIB1), where "ims-EmergencySupport" is used to indicate whether there is a PLMN supporting the IMS emergency service in the PLMNs connected to the base station, and "ims-EmergencySupport-snpn" is used to indicate whether there is an SNPN supporting the IMS emergency service in the SNPNs connected to the base station. When the serving cell is connected to one or more PLMNs supporting the IMS emergency service, "ims-EmergencySupport" is set to TRUE; when the serving cell is connected to one or more SNPNs supporting the IMS emergency service, "ims-EmergencySupport-snpn" is set to TRUE.

In this implementation, when the terminal working in the SNPN mode needs to initiate an IMS emergency service request, the terminal sends the IMS emergency service request to the serving base station if it is determined according to the value of the first indication information in the received system information that at least one of the SNPNs connected to the serving base station supports the IMS emergency service. The base station may select one SNPN from the SNPNs connected thereto and supporting the IMS emergency service, where the selection criteria may be based on the stability of the SNPN or the strength of the signal of the SNPN received by the terminal; and send the request to the selected SNPN.

For example, the base station pre-configures SNPN1, SNPN2 among SNPN1, SNPN2 and SNPN3 connected thereto to support the IMS emergency service, so the value of the first indication information in the system information is 1. The terminal working in the SNPN mode initiates an IMS emergency service request on an SNPN according to the value of the received first indication information. The signal of the SNPN1 is relatively strong and stable, and the base station sends the request to the SNPN1 that supports the IMS emergency service.

When the terminal working in the PLMN mode in the restricted state needs to initiate an IMS emergency service, the terminal determines whether the IMS emergency service can be initiated according to the information element "ims-EmergencySupport" in the received SIB1. If the IMS emergency service can be initiated, an IMS emergency service request is sent to the base station, and the base station sends the IMS emergency service request to the PLMN.

In embodiments of the disclosure, the terminal in the SNPN mode in the restricted state determines whether to allow the IMS emergency service to be initiated on the SNPN according to the first indication information, solving the problem that the IMS emergency service initiated by the terminal in the SNPN mode is sent by the base station to the PLMN supporting the IMS emergency service by mistake.

Implementation process of the disclosure will be described below by taking two specific scenarios as examples.

First scenario is as follows.

Figure 3:
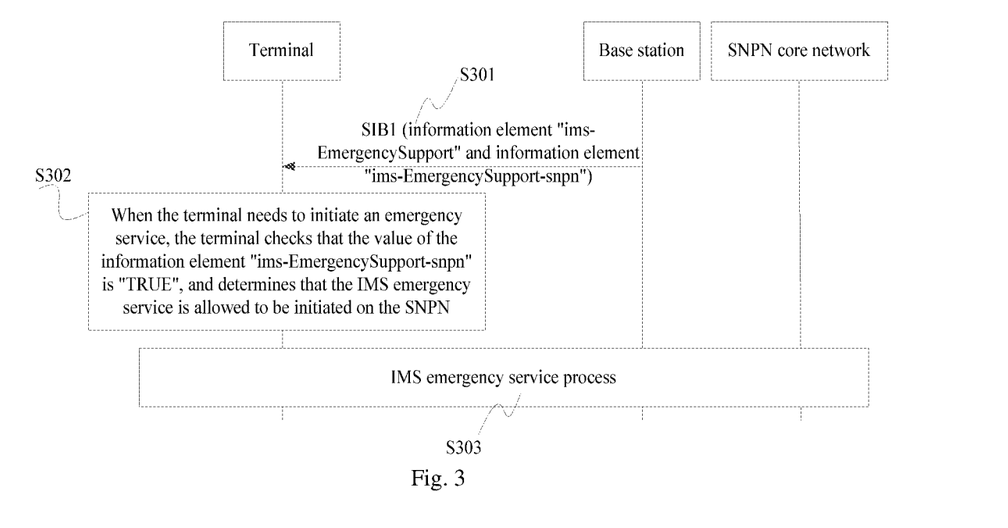
FIG. 3 shows a schematic diagram in which a terminal working in the SNPN mode initiates an IMS emergency service according to an embodiment of the disclosure.

FIG. 3 is a process in which a terminal working in the SNPN mode initiates an IMS emergency service. Here, the base station is connected to a PLMN and an SNPN, and the terminal is a terminal that works in the SNPN mode and is in the restricted state in a serving cell. As shown in the figure, the process may include following steps.

S301: the base station broadcasts an SIB1, the SIB1 carries an information element "ims-EmergencySupport" and an information element "ims-EmergencySupport-snpn".

In this scenario, a value of the information element "ims-EmergencySupport-snpn" is "TRUE", indicating that the SNPN connected to the base station supports the IMS emergency service.

The terminal operating in the SNPN mode receives and stores the information element "ims-EmergencySupport-snpn" in the SIB1 indicating whether the SNPN supports the IMS emergency service.

S302: when the terminal needs to initiate an emergency service, the terminal checks that the value of the information element "ims-EmergencySupport-snpn" is "TRUE", and determines that the IMS emergency service is allowed to be initiated on the SNPN.

S303: the terminal initiates an IMS emergency service process.

In this process, the terminal sends a Radio Resource Control (RRC) connection establishment request to the base station, and the information element "Establishmentcause" in the RRC connection establishment request is set to "emergency", indicating that an IMS emergency service request is initiated. After receiving the RRC connection establishment request, the base station establishes an RRC connection with the terminal. After the RRC connection between the terminal and the base station is established, the terminal sends an MSG5 message (RRC establishment or re-establishment complete message) to the base station, and the MSG5 message carries a network identifier of the SNPN.

If the network identifier is the same as the network identifier of the SNPN connected to the base station and supporting the IMS emergency service, the base station sends an IMS emergency service request to the corresponding SNPN according to the network identifier reported by the terminal in the MSG5. If the network identifier is different from the network identifier of the SNPN connected to the base station and supporting the IMS emergency service, the base station sends an IMS emergency service request to the SNPN that is connected to the base station, has a relatively strong or stable SNPN signal and supports the IMS emergency service.

Second scenario is as follows.

Figure 4:
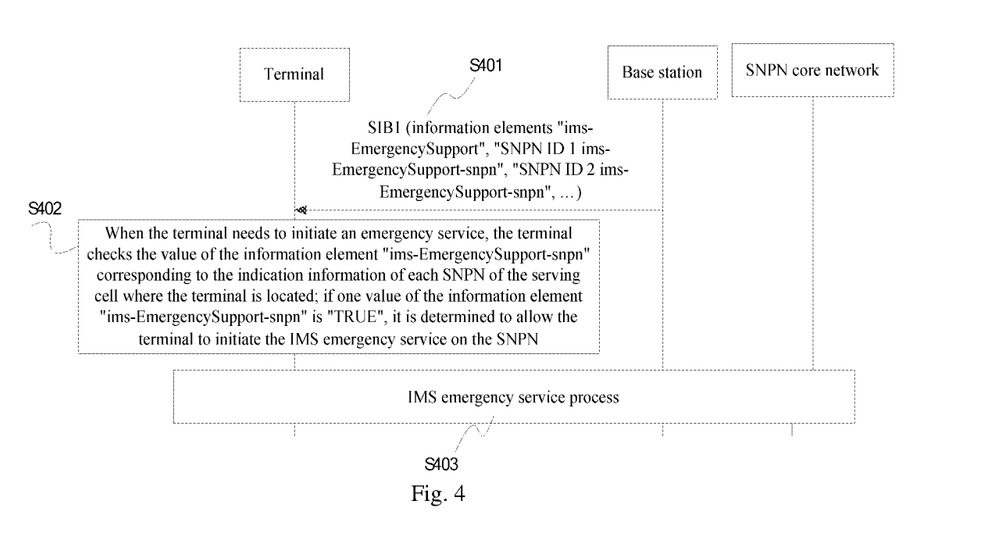
FIG. 4 shows another schematic diagram in which a terminal working in the SNPN mode initiates an IMS emergency service according to an embodiment of the disclosure.

FIG. 4 is another process in which a terminal working in the SNPN mode initiates an IMS emergency service. Here, the base station is connected to a PLMN and an SNPN, and the terminal is a terminal that works in the SNPN mode and is in the restricted state in a serving cell. As shown in the figure, the process may include following steps.

S401: the base station broadcasts an SIB1, the SIB1 carries indication information of each SNPN connected to the base station and information element "ims-EmergencySupport-snpn".

In this scenario, the indication information of the SNPN may be a network identifier of the SNPN or other information that can distinguish different SNPNs, such as an index of the SNPN. The value of "ims-EmergencySupport-snpn" is used to indicate whether the corresponding SNPN supports the IMS emergency service. Optionally, the indication information of the SNPN in this embodiment is "SNPN ID 1 ims-EmergencySupport-snpn", "SNPN ID 2 ims-EmergencySupport-snpn", etc.

S402: when the terminal needs to initiate an emergency service, the terminal checks the value of the information element "ims-EmergencySupport-snpn" corresponding to the indication information of each SNPN of the serving cell where the terminal is located. If one value of the information element "ims-EmergencySupport-snpn" is "TRUE", it is determined to allow the terminal to initiate the IMS emergency service on the SNPN.

S403: the terminal initiates an IMS emergency service process.

This step is similar to the step 303, and the difference is: after the RRC connection between the terminal and the base station is established, the terminal sends an MSG5 message (RRC establishment or re-establishment complete message) to the base station, and the MSG5 message carries a network identifier of the SNPN supporting the IMS emergency service. If the SNPN corresponding to the network identifier supports the IMS emergency service, the base station sends an IMS emergency service request sent by the terminal to the corresponding SNPN; if the SNPN corresponding to the network identifier does not support the IMS emergency service, the base station sends an IMS emergency service request sent by the terminal to the SNPN that has a relatively strong or stable SNPN signal and supports the IMS emergency service.

In embodiments of the disclosure, the system message sent by the base station can respectively indicate the support state of the connected PLMN for the IMS emergency service and the support state of the connected SNPN for the IMS emergency service, so that the terminal in the SNPN mode in the restricted state can determine whether the SNPN connected to the current serving cell supports the IMS emergency service, and the terminal in the PLMN mode in the restricted state can determine whether the PLMN connected to the current serving cell supports the IMS emergency service. In addition, the base station can send the IMS emergency service of the terminals in different modes to the PLMN or SNPN according to the network identifier (PLMN ID or SNPN ID) reported by the terminals.

Based on the same technical concept, an embodiment of the disclosure provides a terminal, and the terminal can implement the method on the terminal side in the foregoing embodiments.

Figure 5:
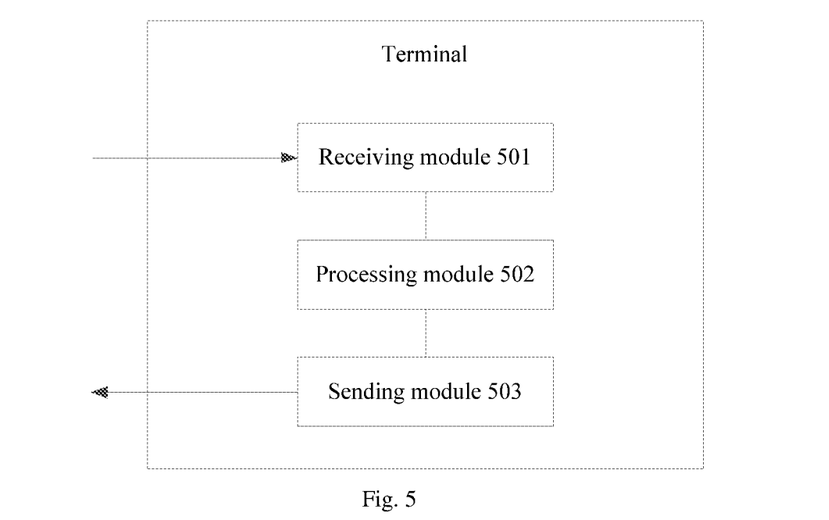
FIG. 5 shows a structural schematic diagram of a terminal according to an embodiment of the disclosure.

Referring to FIG. 5, the terminal includes: a receiving module 501, a processing module 502 and a sending module 503.

The receiving module 501 is configured to receive system information sent by a base station connected to an SNPN and a PLMN. The system information includes first indication information for indicating whether the SNPN supports an IMS emergency service and second indication information for indicating whether the PLMN supports the IMS emergency service.

The processing module 502 is configured to determine whether to allow the IMS emergency service to be initiated on the SNPN according to the first indication information when the terminal is a terminal working in an SNPN mode; and determine whether to allow the IMS emergency service to be initiated on the PLMN according to the second indication information when the terminal is a terminal working in a PLMN mode.

The sending module 503 is configured to send an IMS emergency service request to the base station according to the first indication information. The IMS emergency service request is sent by the base station to the SNPN supporting the IMS emergency service.

The terminal working in the SNPN mode sends an SNPN network identifier of the SNPN where the terminal is currently located to the base station, so that the base station sends the IMS emergency service request sent by the terminal in the SNPN mode to the SNPN corresponding to the SNPN network identifier when the SNPN corresponding to the SNPN network identifier supports the IMS emergency service.

Optionally, the sending module 503 is further configured to send an IMS emergency service request to the base station according to the second indication information. The IMS emergency service request is sent by the base station to the PLMN supporting the IMS emergency service.

Optionally, in the system information received by the terminal, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1; or the first indication information includes indication information for indicating whether there is an SNPN supporting the IMS emergency service in SNPNs connected to the base station.

For functions of the modules in the above-mentioned terminal, reference may be made to the description of functions implemented by the terminal in the foregoing embodiments, which will not be repeated here.

Based on the same technical concept, an embodiment of the disclosure further provides a base station, and the base station can implement the method on the base station side in the foregoing embodiments.

Figure 6:
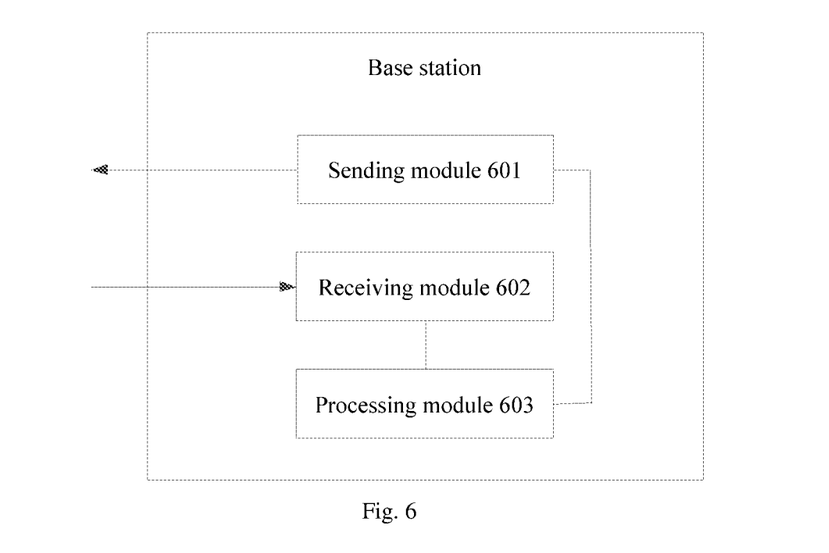
FIG. 6 shows a structural schematic diagram of a base station according to an embodiment of the disclosure.

Referring to FIG. 6, the base station includes: a sending module 601, a receiving module 602 and a processing module 603.

The sending module 601 is configured to send system information. The system information includes first indication information for indicating whether an SNPN supports an IMS emergency service and second indication information for indicating whether a PLMN supports the IMS emergency service.

The receiving module 602 is configured to receive an IMS emergency service request sent by a terminal working in an SNPN mode. The IMS emergency service request is sent by the terminal working in the SNPN mode according to the first indication information.

The processing module 603 is configured to send the IMS emergency service request sent by the terminal working in the SNPN mode to the SNPN.

Optionally, the receiving module 602 is further configured to receive an IMS emergency service request sent by a terminal working in a PLMN mode. The IMS emergency service request is sent by the terminal working in the PLMN mode according to the second indication information.

Optionally, the processing module 603 is further configured to send the IMS emergency service request sent by the terminal working in the PLMN mode to the PLMN.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1; or the first indication information includes indication information for indicating whether there is an SNPN supporting the IMS emergency service in SNPNs connected to the base station.

Optionally, the operation of sending the IMS emergency service request to the SNPN supporting the IMS emergency service after the receiving module 602 receives the IMS emergency service request sent by the terminal working in the SNPN mode, includes: sending the IMS emergency service request to the SNPN corresponding to an SNPN network identifier according to the SNPN network identifier sent by the terminal working in the SNPN mode to the base station when the SNPN corresponding to the SNPN network identifier supports the IMS emergency service, after the base station receives the IMS emergency service request sent by the terminal working in the SNPN mode; or selecting one of SNPNs supporting the IMS emergency service connected to the base station, and sending the IMS emergency service request to a selected SNPN, after the base station receives the IMS emergency service request sent by the terminal working in the SNPN mode.

For functions of the modules in the above-mentioned base station, reference may be made to the description of the functions implemented by the base station in the foregoing embodiments, which will not be repeated here.

Based on the same technical concept, an embodiment of the disclosure further provides a terminal, and the terminal can implement functions of the terminal side in the foregoing embodiments.

Figure 7:
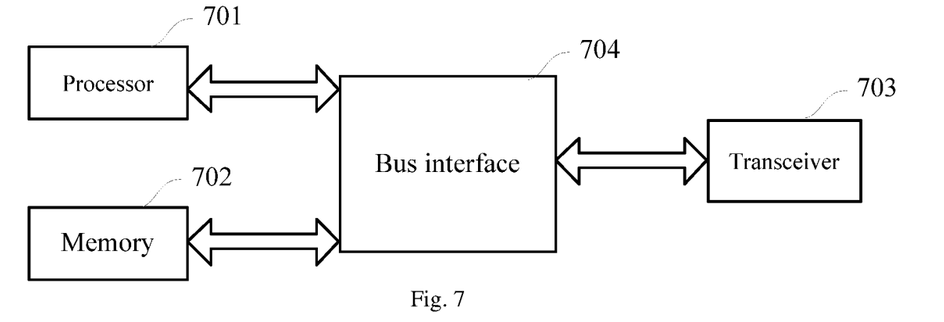
FIG. 7 shows a structural schematic diagram of a terminal according to an embodiment of the disclosure.

FIG. 7 shows a structural schematic diagram of the terminal in an embodiment of the disclosure. As shown, the terminal may include: a processor 701, a memory 702, a transceiver 703 and a bus interface 704.

The memory 702 may store computer instructions used by the processor 701 in performing operations. The transceiver 703 is configured to receive and send data under control of the processor 701. The processor 701 is configured to read the computer instructions stored in the memory 702, and is responsible for managing the bus architecture and general processing, and performs the following operations: receiving system information sent by a base station connected to an SNPN and a PLMN, where the system information includes first indication information for indicating whether the SNPN supports an IMS emergency service and second indication information for indicating whether the PLMN supports the IMS emergency service; determining whether to allow the IMS emergency service to be initiated on the SNPN according to the first indication information.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1; or the first indication information includes indication information for indicating whether there is an SNPN supporting the IMS emergency service in SNPNs connected to the base station.

Optionally, the operations performed by the processor 701 further include: sending an SNPN network identifier of the SNPN where the terminal is currently located to the base station, so that the base station sends an IMS emergency service request sent by the terminal in an SNPN mode to the SNPN corresponding to the SNPN network identifier when the SNPN corresponding to the SNPN network identifier supports the IMS emergency service.

The bus architecture may include any numbers of interconnected buses and bridges, and link various circuits of one or more processors represented by the processor 701 and the memory represented by the memory 702. The bus architecture may further link various other circuits such as peripheral device, voltage regulator and power management circuit, which are all well known in the art and thus will not be further described again herein. The bus interface provides an interface. The processor 701 is responsible for managing the bus architecture and general processing, and the memory 702 may store the data used by the processor 701 when performing the operations.

The procedure disclosed by embodiments of the disclosure may be applied in the processor 701 or implemented by the processor 701. In the implementation process, each step of the signal processing flow may be completed by the integrated logic circuit of hardware in the processor 701 or the instruction in the form of software. The processor 701 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the disclosure. The general-purpose processor may be a microprocessor or any conventional processor or the like. The steps of the method disclosed in combination with embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 702, and the processor 701 reads information in the memory 702 and completes the steps of the signal processing flow in combination with hardware of the processor 701.

The processor 701 is configured to read computer instructions in the memory 702 and execute the functions implemented on the terminal side in the process shown in FIG. 2.

It should be noted here that the above-mentioned terminal provided in this embodiment of the invention can implement all the method steps implemented in the above-mentioned method embodiment and can achieve the same technical effects. The parts and beneficial effects in this embodiment same as those in the method embodiment will not be described here in detail.

Based on the same technical concept, an embodiment of the disclosure further provides a base station, and the base station can implement the functions of the base station side in the foregoing embodiments.

Figure 8:
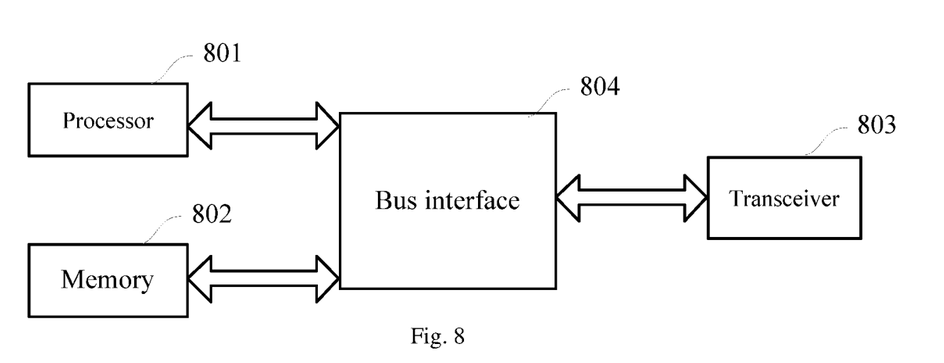
FIG. 8 shows a structural schematic diagram of a base station according to an embodiment of the disclosure.

FIG. 8 shows a structural schematic diagram of the base station in an embodiment of the disclosure. As shown, the base station may include: a processor 801, a memory 802, a transceiver 803 and a bus interface 804.

The memory 802 may store computer instructions used by the processor 801 in performing operations. The transceiver 803 is configured to receive and send data under control of the processor 801. The processor 801 is configured to read the computer instructions stored in the memory 802, and is responsible for managing the bus architecture and general processing, and performs the following operations: sending system information, where the system information includes first indication information for indicating whether an SNPN supports an IMS emergency service and second indication information for indicating whether a PLMN supports the IMS emergency service; sending an IMS emergency service request to the SNPN supporting the IMS emergency service after receiving the IMS emergency service request sent by a terminal working in an SNPN mode; where the IMS emergency service request is sent by the terminal working in the SNPN mode according to the first indication information.

Optionally, the operations performed by the processor 801 further include: sending an IMS emergency service request to the PLMN supporting the IMS emergency service after receiving the IMS emergency service request sent by a terminal working in a PLMN mode; where the IMS emergency service request is sent by the terminal working in the PLMN mode according to the second indication information.

Optionally, the first indication information includes indication information of N SNPNs and indication information corresponding to each of the N SNPNs for indicating whether the corresponding SNPN supports the IMS emergency service, where N is equal to a quantity of SNPNs connected to the base station, and N is an integer greater than or equal to 1; or the first indication information includes indication information for indicating whether there is an SNPN supporting the IMS emergency service in SNPNs connected to the base station.

Optionally, the operation of sending the IMS emergency service request to the SNPN supporting the IMS emergency service after the base station receives the IMS emergency service request sent by the terminal working in the SNPN mode, includes: sending the IMS emergency service request to the SNPN corresponding to an SNPN network identifier according to the SNPN network identifier sent by the terminal working in the SNPN mode to the base station when the SNPN corresponding to the SNPN network identifier supports the IMS emergency service, after the base station receives the IMS emergency service request sent by the terminal working in the SNPN mode; or selecting one of SNPNs supporting the IMS emergency service connected to the base station, and sending the IMS emergency service request to a selected SNPN, after the base station receives the IMS emergency service request sent by the terminal working in the SNPN mode.

The bus architecture may include any numbers of interconnected buses and bridges, and link various circuits of one or more processors represented by the processor 801 and the memory represented by the memory 802. The bus architecture may further link various other circuits such as peripheral device, voltage regulator and power management circuit, which are all well known in the art and thus will not be further described again herein. The bus interface provides an interface. The processor 801 is responsible for managing the bus architecture and general processing, and the memory 802 may store the data used by the processor 801 when performing the operations.

The procedure disclosed by embodiments of the disclosure may be applied in the processor 801 or implemented by the processor 801. In the implementation process, each step of the signal processing flow may be completed by the integrated logic circuit of hardware in the processor 801 or the instruction in the form of software. The processor 801 may be a general-purpose processor, a digital signal processor, an application specific integrated circuit, a field programmable gate array or other programmable logic device, a discrete gate or transistor logic device, or a discrete hardware component, and may implement or perform each method, step and logical block diagram disclosed in embodiments of the disclosure. The general-purpose processor may be a microprocessor or any conventional processor or the like. The steps of the method disclosed in combination with embodiments of the disclosure may be directly completed by a hardware processor, or completed by a combination of hardware and software modules in the processor. The software modules may be located in the random access memory, flash memory, read only memory, programmable read only memory or electrically erasable programmable read only memory, register and other mature storage medium in the art. The storage medium is located in the memory 802, and the processor 801 reads the information in the memory 802 and completes the steps of the signal processing flow in combination with hardware of the processor 801.

The processor 801 is configured to read computer instructions in the memory 802 and execute the functions implemented on the base station side in the process shown in FIG. 2.

It should be noted here that the above-mentioned base station provided in this embodiment of the invention can implement all the method steps implemented in the above-mentioned method embodiment and can achieve the same technical effects. The parts and beneficial effects in this embodiment same as those in the method embodiment will not be described here in detail.

An embodiment of the disclosure further provides a computer readable storage medium storing computer executable instructions, and the computer executable instructions are configured to cause a computer to execute the method performed by the terminal in the above-mentioned embodiments.

An embodiment of the disclosure further provides a computer readable storage medium storing computer executable instructions, and the computer executable instructions are configured to cause a computer to execute the method performed by the base station in the above-mentioned embodiments.

It should be understood by those skilled in the art that embodiments of the disclosure can be provided as methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. An indication method for an IP Multimedia Subsystem, (IMS), emergency service state, the method comprising:
   receiving, by a terminal working in a Stand-alone Non-Public Network (SNPN) mode, system information sent by a base station connected to an SNPN and a Public Land Mobile Network (PLMN), the system information comprising first indication information for indicating whether the SNPN supports an IMS emergency service;
   determining, by the terminal working in the SNPN mode, whether to allow the IMS emergency service to be initiated on the SNPN according to the first indication information.

2. The method according to claim 1, wherein the terminal further works in a PLMN mode, the system information further comprises second indication information for indicating whether the PLMN supports the IMS emergency service; the method further comprises:
   determining, by the terminal working in the PLMN mode, whether to allow the IMS emergency service to be initiated on the PLMN according to the second indication information.

3. The method according to claim 1, wherein the first indication information comprises indication information of N SNPNs and indication information corresponding to each of the N SNPNs for indicating whether the corresponding SNPN supports the IMS emergency service, wherein N is equal to a quantity of SNPNs connected to the base station, and N is an integer greater than or equal to 1.

4. The method according to claim 1, wherein the first indication information comprises indication information for indicating whether there is an SNPN supporting the IMS emergency service in SNPNs connected to the base station.

5. The method according to claim 1, wherein the method further comprises:
   sending, by the terminal working in the SNPN mode, an SNPN network identifier of the SNPN where the terminal is currently located to the base station, so that the base station sends an IMS emergency service request sent by the terminal in the SNPN mode to the SNPN corresponding to the SNPN network identifier when the SNPN corresponding to the SNPN network identifier supports the IMS emergency service.

6. An indication method for an IP Multimedia Subsystem (IMS) emergency service state, the method comprising:
   sending, by a base station connected to a Stand-alone Non-Public Network (SNPN) and a Public Land Mobile Network (PLMN) system information, the system information comprising first indication information for indicating whether the SNPN supports an IMS emergency service;
   sending, by the base station, an IMS emergency service request to the SNPN supporting the IMS emergency service after receiving the IMS emergency service request sent by a terminal working in an SNPN mode; wherein the IMS emergency service request is sent by the terminal working in the SNPN mode according to the first indication information.

7. The method according to claim 6, wherein the system information further comprises second indication information for indicating whether the PLMN supports the IMS emergency service; wherein the method further comprises:
   sending, by the base station, an IMS emergency service request to the PLMN supporting the IMS emergency service after receiving the IMS emergency service request sent by the terminal working in a PLMN mode; wherein the IMS emergency service request is sent by the terminal working in the PLMN mode according to the second indication information.

8. The method according to claim 6, wherein the first indication information comprises indication information of N SNPNs and indication information corresponding to each of the N SNPNs for indicating whether the corresponding SNPN supports the IMS emergency service, wherein N is equal to a quantity of SNPNs connected to the base station, and N is an integer greater than or equal to 1.

9. The method according to claim 6, wherein the first indication information comprises indication information for indicating whether there is an SNPN supporting the IMS emergency service in SNPNs connected to the base station.

10. The method according to claim 6, wherein sending, by the base station, the IMS emergency service request to the SNPN supporting the IMS emergency service after receiving the IMS emergency service request sent by the terminal working in the SNPN mode, comprises:

sending, by the base station, the IMS emergency service request to the SNPN corresponding to an SNPN network identifier according to the SNPN network identifier sent by the terminal working in the SNPN mode to the base station when the SNPN corresponding to the SNPN network identifier supports the IMS emergency service, after receiving the IMS emergency service request sent by the terminal working in the SNPN mode; or selecting, by the base station, one of SNPNs supporting the IMS emergency service connected to the base station, and sending the IMS emergency service request to a selected SNPN, after receiving the IMS emergency service request sent by the terminal working in the SNPN mode.

11. A terminal, the terminal comprising: a processor, a memory and a transceiver;

the transceiver is configured to receive and send data under control of the processor;

the memory is configured to store computer instructions;

the processor is configured to read the computer instructions to perform following operations:

receiving system information sent by a base station connected to a Stand-alone Non-Public Network (SNPN) and a Public Land Mobile Network (PLMN), the system information comprising first indication information for indicating whether the SNPN supports an IP Multimedia Subsystem (IMS) emergency service;

determining whether to allow the IMS emergency service to be initiated on the SNPN according to the first indication information.

12. The terminal according to claim 11, wherein the first indication information comprises indication information of N SNPNs and indication information corresponding to each of the N SNPNs for indicating whether the corresponding SNPN supports the IMS emergency service, wherein N is equal to a quantity of SNPNs connected to the base station, and N is an integer greater than or equal to 1.

13. The terminal according to claim 11, wherein the first indication information comprises indication information for indicating whether there is an SNPN supporting the IMS emergency service in SNPNs connected to the base station.

14. The terminal according to claim 11, wherein the system information further comprises second indication information for indicating whether the PLMN supports the IMS emergency service; wherein the operations further comprise:

sending an SNPN network identifier of the SNPN where the terminal is currently located to the base station, so that the base station sends an IMS emergency service request sent by the terminal in an SNPN mode to the SNPN corresponding to the SNPN network identifier when the SNPN corresponding to the SNPN network identifier supports the IMS emergency service.

15. A base station, the base station comprising: a processor, a memory and a transceiver;

the transceiver is configured to receive and send data under control of the processor;

the memory is configured to store computer instructions;

the processor is configured to read the computer instructions to perform following operations:

sending system information, the system information comprising first indication information for indicating whether a Stand-alone Non-Public Network (SNPN) supports an IP Multimedia Subsystem IMS emergency service;

sending an IMS emergency service request to the SNPN supporting the IMS emergency service after receiving the IMS emergency service request sent by a terminal working in an SNPN mode; wherein the IMS emergency service request is sent by the terminal working in the SNPN mode according to the first indication information.

16. The base station according to claim 15, wherein the system information further comprises second indication information for indicating whether a Public Land Mobile Network (PLMN) supports the IMS emergency service; wherein the operations further comprise:

sending an IMS emergency service request to the PLMN supporting the IMS emergency service after receiving the IMS emergency service request sent by thea terminal working in a PLMN mode; wherein the IMS emergency service request is sent by the terminal working in the PLMN mode according to the second indication information.

17. The base station according to claim 15, wherein the first indication information comprises indication information of N SNPNs and indication information corresponding to each of the N SNPNs for indicating whether the corresponding SNPN supports the IMS emergency service, wherein N is equal to a quantity of SNPNs connected to the base station, and N is an integer greater than or equal to 1.

18. The base station according to claim 15, wherein the first indication information comprises indication information for indicating whether there is an SNPN supporting the IMS emergency service in SNPNs connected to the base station.

19. The base station according to claim 15, wherein sending the IMS emergency service request to the SNPN supporting the IMS emergency service after receiving the IMS emergency service request sent by the terminal working in the SNPN mode, comprises:

sending the IMS emergency service request to the SNPN corresponding to an SNPN network identifier according to the SNPN network identifier sent by the terminal working in the SNPN mode to the base station when the SNPN corresponding to the SNPN network identifier supports the IMS emergency service, after receiving the IMS emergency service request sent by the terminal working in the SNPN mode; or selecting one of SNPNs supporting the IMS emergency service connected to the base station, and sending the IMS emergency service request to a selected SNPN, after receiving the IMS emergency service request sent by the terminal working in the SNPN mode.

20. A non-transitory computer readable storage medium, wherein the computer readable storage medium stores computer executable instructions, and the computer executable instructions are configured to cause a computer to perform the method of claim 1.

* * * * *